United States Patent
Karol et al.

(10) Patent No.: US 6,235,686 B1
(45) Date of Patent: May 22, 2001

(54) LUBRICATING COMPOSITIONS CONTAINING AROMATIZED 1,2-DIHYDRO-2,2,4-TRIMETHYLQUINOLINE POLYMERS

(75) Inventors: Thomas J. Karol, Norwalk; Steven G. Donnelly, New Fairfield, both of CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 0 days.

(21) Appl. No.: 09/640,321

(22) Filed: Aug. 16, 2000

(51) Int. Cl.$^7$ .................... C10M 133/38; C10M 133/40
(52) U.S. Cl. ............................. 508/261; 508/244
(58) Field of Search ............................................ 508/261

(56) References Cited

U.S. PATENT DOCUMENTS

| | | | |
|---|---|---|---|
| 2,908,646 | 10/1959 | Roach et al. | 508/221 |
| 4,692,258 | * 9/1987 | Rasberger et al. | 508/261 |
| 4,919,832 | * 4/1990 | Meier et al. | 508/261 |
| 4,965,006 | * 10/1990 | Meier et al. | 508/261 |
| 5,246,606 | * 9/1993 | Evans | 508/261 |

OTHER PUBLICATIONS

Lattimer et al., "Characterization of Aniline–Acetone Condensation Products by Liquid Chromatography and Mass Spectroscopy," Rubber Chemistry and Technology, vol. 53, pp. 346–356 (1980).

Zobian et al., "The Aromatization of Dihydroquinolines by Loss of the Elements of a Hydrocarbon," Journal of Organic Chemistry, vol. 29, pp. 584–588 (1964).

* cited by examiner

Primary Examiner—Ellen M. McAvoy
(74) Attorney, Agent, or Firm—Norris, McLaughlin & Marcus P.A.

(57) ABSTRACT

Lubricating compositions containing a major amount of a base oil and an effective amount of an additive component having at least one compound of formula (I):

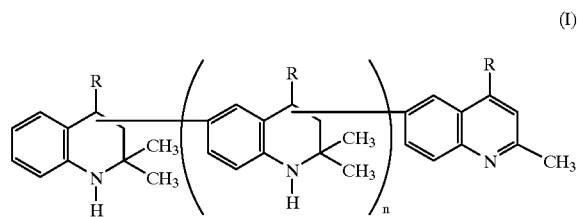

where R is one of the following radicals, methyl, ethyl, n-propyl, i-propyl or a combination thereof, and n=0–8. In a preferred embodiment, R is a methyl radical and n=2–3. The lubricating compositions provide improved lubricating performance, particularly by inhibiting oxidation and improving thermal stability.

21 Claims, No Drawings

LUBRICATING COMPOSITIONS CONTAINING AROMATIZED 1,2-DIHYDRO-2,2,4-TRIMETHYLQUINOLINE POLYMERS

BACKGROUND OF INVENTION

The present invention relates to lubricating compositions and, in particular, to lubricating compositions containing antioxidants.

It is well known that lubricants are susceptible to deterioration due to oxidation resulting in a decline of performance. The oxidation process leads to a loss of lubricating properties and an inadequate protection of a device or machinery to be lubricated. A general description of lubricants and lubricant oxidation can be found in Kirk-Othmer's Encyclopedia of Chemical Technology, Vol. 15, pp. 463–515 (4th Edition, 1995). The oxidation of lubricants normally proceeds via a free-radical mechanism. To inhibit oxidation, various compounds are added to lubricants to serve as oxidation inhibitors. The oxidation inhibitors function by breaking the free-radical chain reactions which lead to lubricant oxidation.

An example of one type of oxidation inhibitor is non-aromatized polymers of 2,2,4-trimethyl-1,2-dihydroquinoline (known as TMDQ). The polymerization of 2,2,4-trimethyl-1,2-dihydroquinoline and the use of TMDQ polymers with non-aromatic terminal units as oxidation inhibitors are disclosed in U.S. Pat. No. 2,908,646 to Roach et al., which is herein incorporated by reference.

Despite the availability of oxidation inhibitors, such as non-aromatized TMDQ polymers, there is a continuing need for new oxidation inhibitors that provide improved performance for lubricating compositions. Accordingly, it is an object of the present invention to provide lubricating compositions with increased performance.

SUMMARY OF THE INVENTION

It has now been discovered that TMDQ polymers and their homologs containing aromatized terminal units exhibit improved antioxidation properties in comparison with the non-aromatized TMDQ polymers. In accordance with the present invention, there is provided a lubricating composition containing a major amount of a base oil and an effective amount of an additive component which includes one or more compounds of formula (I):

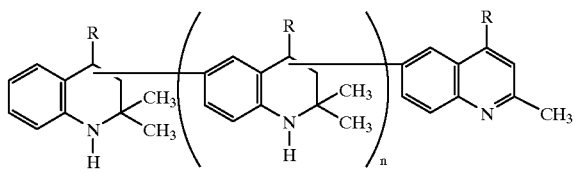

(I)

The additive component containing the compound of formula (I) is present in a quantity between 0.01 and 10 percent by weight of the composition. Preferably, the additive component is present in a quantity of 0.1–5% by weight with 1–3% by weight being more preferred. The compound of formula (I) has a value for "n" ranging from 0–8. Preferably, "n" has a value of 0–6 with a value of 0–4 being more preferred. The base oil is preferably a base oil of lubricating viscosity.

In one preferred embodiment, the lubricating composition of the present invention contains an effective amount of an additive component which includes one or more compounds of formula (II):

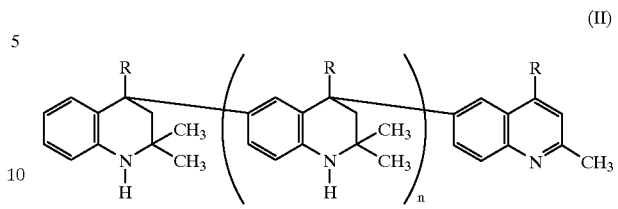

(II)

In another preferred embodiment, the lubricating composition of the present invention contains an effective amount of an additive component which contains one or more compounds of formula (III):

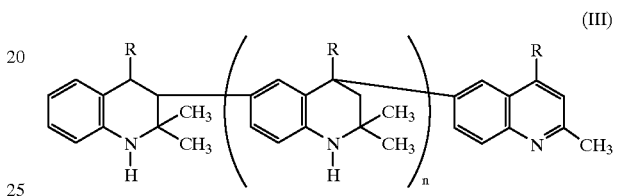

(III)

The lubricating compositions of the present invention can also include one or more additional antioxidants and other conventional additives. Accordingly, lubricating compositions with improved performance are provided as will be further illustrated below.

DETAILED DESCRIPTION OF THE INVENTION

The present invention provides lubricating compositions that includes an additive component having one or more compounds with the formula (I):

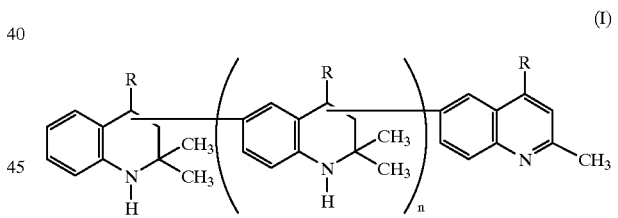

(I)

where R is one of the following radicals: methyl, ethyl, n-propyl or i-propyl, or combinations thereof, and "n" has a value in the range of 0–8. Preferably "n" ranges from 0 to 6 with a range from 0 to 4 being more preferred.

The additive component containing the compound of formula (I) is added to the desired base oil of lubricating viscosity in an amount effective to prevent oxidation. An effective amount of the additive component can range, for example, from about 0.01 to about 10 percent by weight of the lubricating composition with about 0.1 to about 5.0 percent by weight being preferred, and with about 1 to about 3 percent by weight being more preferred.

In accordance with the present invention, the compositions of the present invention include lubricating oils and lubricating greases containing a major amount of base oil. The base oil may be, for example, a petroleum-based hydrocarbon oil or a synthetic oil, or mixture thereof. Any base oil of lubricating viscosity, as known in the art, can be used in accordance with the present invention. The representative petroleum-based oils are, for example, naphthenic, aromatic, and paraffinic mineral oils. The representative synthetic oils are, for example, the oils synthesized from alkylene polymers, carboxylic acid esters, polyglycol ethers, poly-α-olefins, Pennzane (i.e., multiply alkylated cyclopentanes), and silahydrocarbons. Particularly preferred are the lubricant compositions based on a diester synthetic oil.

The non-aromatized dihydroquinoline (i.e., TMDQ) polymers are known in the art and may be obtained by polymerization of TMDQ or its analogs, as described by the Reaction

REACTION SCHEME 1

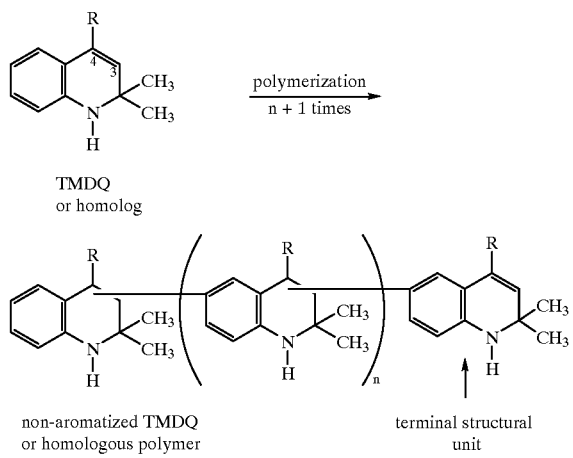

While not wishing to be bound by any one theory, it is believed that the polymerization reaction may proceed either through the 3-position or the 4-position carbon. The 4-position intermediates are stabilized by the alkyl R-group in the 4-position. However, the polymerization of TMDQ and its homologs can also produce polymers formed through the 3-position intermediates and mixtures polymers formed from the 3-position and 4-position carbons.

The compounds of formula (I) are obtained by aromatization of the terminal structural unit of TMDQ polymers or homologous polymers, as shown in the Reaction Scheme 2:

REACTION SCHEME 2

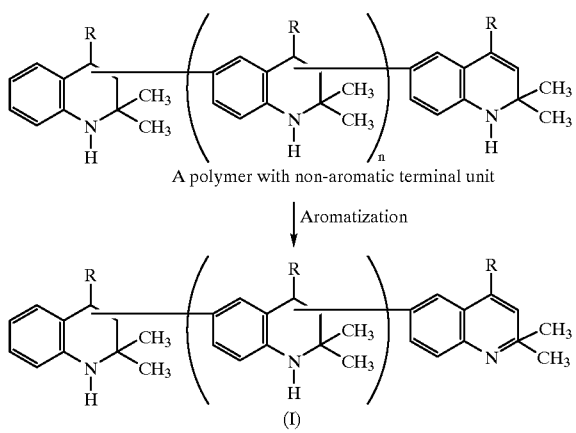

To obtain the aromatized polymers, the non-aromatized TMDQ or homologous polymers may be treated with strong base, for example, with sodium aniline to yield the corresponding aromatized polymers and methane. Alternatively, the aromatization is conducted in acidic conditions by treating the non-aromatized TMDQ polymers with an equivalent amount of hydrochloric acid.

As will be apparent from Reaction Scheme 2, the chemical structure of the compounds of formula (I) will depend upon the chemical structure of the starting TMDQ polymers. Therefore, it will be also apparent to one skilled in the art that the compounds of formula (I) may include polymers derived through the 4-position intermediates, 3-position intermediates, polymers with randomly alternating 3-position and 4-position-derived structural units, as well as a mixture of corresponding polymers with varying numbers of structural units.

Residual amounts of TMDQ or homologous monomers, corresponding aromatized monomers and non-aromatized TMDQ polymers may also be present due to the presence of these compounds in the reaction mixtures leading up to the aromatized polymers of formula (1). However, the TMDQ monomer should be present in an amount of less than 1 percent and preferably less than 0.1 percent.

In a preferred embodiment of the present invention, there is provided a lubricating composition containing a major amount of a mineral or synthetic oil, and an additive component containing one or more compounds of formula (II):

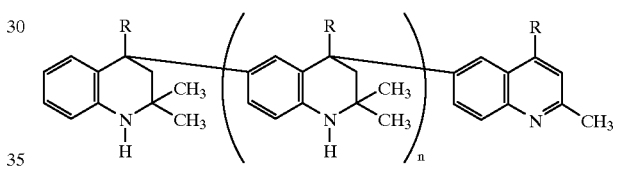

(II)

where R is one of the following radicals methyl, ethyl, n-propyl or i-propyl, or mixtures thereof and "n" ranges from 0 to 8, with 0 to 6 being preferred. More preferably, the additive component of this embodiment of the present invention contains one or more compounds of formula (II) with the number of structural units ranging from two to six (i.e., n=0–4). The additive component containing the compound of formula (II) is added to the base oil in an amount effective to prevent oxidation. An effective amount of the additive component can range, for example, from about 0.01 to about 10 percent by weight of the lubricating composition with about 0.1 to about 5.0 percent by weight being preferred, and with about 1 to about 3 percent by weight being more preferred.

In another preferred embodiment of the present invention, there is provided a lubricating composition containing a major amount of a mineral or synthetic oil, and an additive component containing one or more compounds of formula (III):

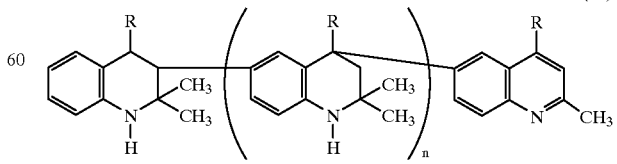

(III)

where R is one of the following radicals, methyl, ethyl, n-propyl or i-propyl, or combinations thereof, and "n" has a value of 0–8. One particularly preferred radical is methyl. Preferably, the compounds of formula (III) have an "n" value ranging from 0–6 with an "n" value from 0–4 being more preferred. The composition can also contain a single aromatized TMDQ polymer of formula (III), or a mixture thereof. The additive component containing the compound of formula (III) is added to the base oil in an amount effective to prevent oxidation. An effective amount of the additive component can range, for example, from about 0.01 to about 10 percent by weight of the lubricating composition with about 0.1 to about 5.0 percent by weight being preferred, and with about 1 to about 3 percent by weight being more preferred.

Aromatized TMDQ polymers to be used as the additive component in accordance with the present invention are known in the art and are commercially available. One such commercially available aromatized TMDQ polymer resin is sold under the tradename AGERITE® MA, which contains a mixture of aromatized TMDQ polymers, and is manufactured by B.F. Goodrich.

In addition to providing oxidation protection, the aromatized TMDQ polymers are also useful as corrosion inhibitors. Thus, according to the present invention, both oxidation protection and corrosion inhibition in lubricating oils can be accomplished by use the aromatized polymers.

The lubricating compositions of the present invention can also contain other ingredients, such as, for example, emulsifiers and viscosity improvers. Greases may be prepared by adding a sufficient amount of a thickener such as, for example, salts and complexes of fatty acids, polyurea compounds, clays and quaternary ammonium bentonite. The lubricating compositions may also contain one or more of the following additives:

1. Borated and/or non-borated dispersants.
2. Additional anti-oxidation compounds
3. Seal swell compositions.
4. Friction modifiers.
5. Pressure/anti-wear agents.
6. Viscosity modifiers.
7. Pour point depressants.
8. Detergents.
9. Phosphorus acids.
10. Antifoamants.

1. Ashless Dispersants. Non-borated ashless dispersants may be incorporated within the final fluid composition in an amount comprising up to 10 weight percent on an oil-free basis. Many types of ashless dispersants listed below are known in the art. Borated ashless dispersants may also be included.

(A) "Carboxylic dispersants" are reaction products of carboxylic acylating agents (acids, anhydrides, esters, etc.) containing at least about 34 and preferably at least about 54 carbon atoms reacted with nitrogen-containing compounds (such as amines), organic hydroxy compounds (such aliphatic compounds including monohydric and polyhydric alcohols, or aromatic compounds including phenols and naphthols), and/or basic inorganic materials. These reaction products include imide, amide, and ester reaction products of carboxylic acylating agents. Examples of these materials include succinimide dispersants and carboxylic ester dispersants. The carboxylic acylating agents include alkyl succinic acids and anhydrides wherein the alkyl group is a polybutyl moiety, fatty acids, isoaliphatic acids (e.g., 8-methyloctadecanoic acid), dimer acids, addition dicarboxylic acids, addition (4+2 and 2+2) products of an unsaturated fatty acid with an unsaturated carboxylic reagent), trimer acids, addition tricarboxylic acids (e.g., Empol® 1040, Hystrene® 5460 and Unidyme® 60), and hydrocarbyl substituted carboxylic acylating agents (from olefins and/or polyalkenes). In one preferred embodiment, the carboxylic acylating agent is a fatty acid. Fatty acids generally contain from about 8 up to about 30, or from about 12 up to about 24 carbon atoms. Carboxylic acylating agents are taught in U.S. Pat. Nos. 2,444,328, 3,219,666 and 4,234,435, which are incorporated herein by reference. The amine may be a mono- or polyamine. The monoamines generally have at least one hydrocarbyl group containing 1 to about 24 carbon atoms, with from 1 to about 12 carbon atoms. Examples of monoamines include fatty ($C_8$–$C_{30}$) amines, primary ether amines (SURFAM® amines), tertiary-aliphatic primary amines ("Primene"), hydroxyamines (primary, secondary or tertiary alkanol amines), ether N-(hydroxyhydrocarbyl) amines, and hydroxyhydrocarbyl amines ("Ethomeens" and "Propomeens"). The polyamines include alkoxylated diamines ("Ethoduomeens"), fatty diamines ("Duomeens"), alkylenepolyamines (ethylenepolyamines), hydroxy-containing polyamines, polyoxyalkylene polyamines (such as JEFFAMINES), condensed polyamines (a condensation reaction between at least one hydroxy compound with at least one polyamine reactant containing at least one primary or secondary amino group), and heterocyclic polyamines. Useful amines include those disclosed in U.S. Pat. No. 4,234,435 and U.S. Pat. No. 5,230,714, which are incorporated herein by reference. Examples of these "carboxylic dispersants" are described in British Patent 1,306,529 and in U.S. Pat. Nos. 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, and Re 26,433, which are incorporated herein by reference for disclosure of dispersants.

(B) "Amine dispersants" are reaction products of relatively high molecular weight aliphatic or alicyclic halides and amines, preferably polyalkylene polyamines. Examples thereof are described, for example, in U.S. Pat. Nos. 3,275,554, 3,438,757, 3,454,555, and 3,565,804 which are incorporated herein by reference for disclosure of dispersants.

(C) "Mannich dispersants" are the reaction products of alkyl phenols in which the alkyl group contains at least about 30 carbon atoms with aldehydes (especially formaldehyde) and amines (especially polyalkylene polyamines). The materials described in U.S. Pat. Nos. 3,036,003, 3,236,770, 3,414,347, 3,448,047, 346,172, 3,539,633, 3,586,629, 3,591, 598, 3,634,515, 3,725,480, and 3,726,882 are incorporated herein by reference for disclosure of dispersants.

(D) Post-treated dispersants are obtained by reacting carboxylic, amine or Mannich dispersants with reagents such as urea, thiourea, carbon disulfide, aldehydes, ketones, carboxylic acids, hydrocarbon-substituted succinic anhydrides, nitriles, epoxides, boron compounds, phosphorus compounds or the like. U.S. Pat. Nos. 3,200,107, 3,282, 955, 3,367,943, 3,513,093, 3,639,242, 3,649,659, 3,442,808, 3,455,832, 3,579,450, 3,600,372, 3,702,757, and 3,708,422 are incorporated herein by reference for disclosure of dispersants.

(E) Polymeric dispersants are interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. Polymer dispersants are disclosed in U.S. Pat. Nos. 3,329,658, 3,449,250, 3,519,656, 3,666,730, 3,687, 849, and 3,702,300 which are incorporated herein by reference for disclosure of dispersants and ashless dispersants.

Borated dispersants are described in U.S. Pat. Nos. 3,087,936 and 3,254,025 which are incorporated herein by reference for disclosure of borated dispersants.

Also included as possible dispersant additives are those disclosed in U.S. Pat. Nos. 5,198,133 and 4,857,214 which are incorporated herein by reference. The dispersants of these patents compare the reaction products of an alkenyl succinimide or succinimide ashless dispersant with a phosphorus ester or with an inorganic phosphorus-containing acid or anhydride and a boron compound.

2. Additional antioxidants. In addition to the aromatized TMQ polymers, other antioxidant may be used in the compositions of the present invention, if desired. Typical antioxidants include hindered phenolic antioxidants, secondary aromatic amine antioxidants, sulfurized phenolic antioxidants, oil-soluble copper compounds, phosphorus-containing antioxidants, organic sulfides, disulfides and polysulfides and the like.

Illustrative sterically hindered phenolic antioxidants include orthoalkylated phenolic compounds such as 2,6-di-tertbutylphenol, 4-methyl-2,6-di-tertbutylphenol, 2,4,6-tri-tertbutylphenol, 2-tert-butylphenol, 2,6-disopropylphenol, 2-methyl-6-tertbutylphenol, 2,4-dimethyl-6-tertbutylphenol, 4-(N,N-dimethylaminomethyl)-2,8-di-tertbutylphenol, 4-ethyl-2,6-di-tertbutylphenol, 2-methyl-6-styrylphenol, 2,6-distyryl-4-nonytphenol, and their analogs and homologs. Mixtures of two or more such mononuclear phenolic compounds are also suitable.

Other preferred phenol antioxidants for use in the compositions of this invention are methylene-bridged alkylphenols, and these can be used singly or in combinations with each other, or in combinations with sterically-hindered unbridged phenolic compounds. Illustrative methylene-bridged compounds include 4,4'-methylenebis(6-tert-butyl o-cresol), 4,4'-methylenebis(2-tert-amyl-o-cresol), 2,2'-methytenebis(4-methyl-6-tert-butylphenol), 4,4'-methylenehis (2, 6-di-tertbutylphenol), and similar compounds. Particularly preferred are mixtures of methylene-bridged alkylphenols such as are described in U.S. Pat. No. 3,211,652, which is incorporated herein by reference.

Amine antioxidants, especially oil-soluble aromatic secondary amines may also be used in the compositions of this invention. Although aromatic secondary monoamines are preferred, aromatic secondary polyamines are also suitable. Illustrative aromatic secondary monoamines include diphenylamine, alkyl diphenylamines containing 1 or 2 alkyl substituents each having up to about 16 carbon atoms, phenyl-β-naphthylamine, phenyl-P-napthylamine, alkyl- or aralkylsubstituted phenyl-β-naphthylamine containing one or two alkyl or aralkyl groups each having up to about 16 carbon atoms, alkyl- or aralkylsubstituted phenyl-p-naphthylamine containing one or two alkyl or aralkyl groups each having up to about 16 carbon atoms, and similar compounds.

A preferred type of aromatic amine antioxidant is an alkylated diphenylamine of the general formula:

$R_1-C_6H_4-NH-C_6H_4-R_2$ where $R_1$ is an alkyl group (preferably a branched alkyl group) having 8 to 12 carbon atoms, (more preferably 8 or 9 carbon atoms) and $R_2$ is a hydrogen atom or an alkyl group (preferably a branched alkyl group) having 8 to 12 carbon atoms, (more preferably 8 or 9 carbon atoms). Most preferably, $R_1$ and $R_2$ are the same. One such preferred compound is available commercially as Naugalube® 438L, a material which is understood to be predominately a 4,4'-dinonytdiphenylamine (i.e., bis(4-nonyiphenyl)(amine)) in which the nonyl groups are branched.

Another useful type of antioxidant for preferred inclusion in the compositions of the invention are one or more liquid, partially sulfurized phenolic compounds such as are prepared by reacting sulfur monochloride with a liquid mixture of phenols—at least about 50 weight percent of which mixture of phenols is composed of one or more reactive, hindered phenols—in proportions to provide from about 0.3 to about 0.7 gram atoms of sulfur monochloride per mole of reactive, hindered phenol so as to produce a liquid product. Typical phenol mixtures useful in making such liquid product compositions include a mixture containing by weight about 75% of 2,6-di-tert-butylphenol, about 10% of 2-tert-butylphenol, about 13% of 2,4.6-tri-tertbutylphenol, and about 2% of 2,4-di-tertbutylphenol. The reaction is exothermic and thus is preferably kept within the range of about 15° C. to about 70° C., most preferably between about 40° C. to about 60° C.

Mixtures of different antioxidants may also be used. One suitable mixture is comprised of a combination of: (i) an oil-soluble mixture of at least three different sterically-hindered tertiary butylated monohydric phenols which is in the liquid state at 25° C.; (ii) an oil-soluble mixture of at least three different sterically-hindered tertiary butylated methylene-bridged polyphenols; and (iii) at least one bis(4-alkylphenyl) amine wherein the alkyl group is a branched alkyl group having 8 to 12 carbon atoms, the proportions of (i), (ii) and (iii) on a weight basis failing in the range of 3.5 to 5.0 parts of component (i) and 0.9 to 1.2 parts of component (ii) per part by weight of component (iii), as disclosed in U.S. Pat. No. 5,328,619, which is incorporated herein by reference.

Other useful preferred antioxidants are those included in the disclosure of U.S. Pat. No. 4,031,023, which is herein incorporated by reference.

3. Seal Swell Compositions. Compositions which are designed to keep seals pliable are also well known in the art. A preferred seal swell composition is isodecyl sulfolane. The seal swell agent is preferably incorporated into the composition at about 0.1–3 weight percent. Substituted 3-alkoxysulfolanes are disclosed in U.S. Pat. No. 4,029,587 which is incorporated herein by reference.

4. Friction Modifiers. Friction modifiers are also well known to those skilled in the art. A useful list of friction modifiers are included in U.S. Pat. No. 4,792,410, which is incorporated herein by reference. U.S. Pat. No. 5,110,488 discloses metal salts of fatty acids and especially zinc salts and is incorporated herein by reference. Useful friction modifiers include fatty phosphites, fatty acid amides, fatty epoxides, borated fatty epoxides, fatty amines, glycerol esters, borated glycerol esters alkoxylated fatty amines, borated alkoxylated fatty amines, metal salts of fatty acids, sulfurized olefins, fatty imidazolines, molybdenum dithio-carbamates (e.g., U.S. Pat. No. 4,259,254, incorporated herein by reference), molybdate esters (e.g., U.S. Pat. No. 5,137,647 and U.S. Pat. No. 4,889,647, both incorporated herein by reference), molybdate amine with sulfur donors (e.g., U.S. Pat. No. 4,164,473 incorporated herein by reference), and mixtures thereof.

The preferred friction modifier is a borated fatty epoxide as previously mentioned as being included for its boron content. Friction modifiers are preferably included in the compositions in the amounts of 0.1–10 weight percent and may be a single friction modifier or mixtures of two or more.

Friction modifiers also include metal salts of fatty acids. Preferred cations are zinc, magnesium, calcium, and sodium and any other alkali, or alkaline earth metals may be used. The salts may be overbased by including an excess of cations per equivalent of amine. The excess cations are then treated with carbon dioxide to form the carbonate. The metal salts are prepared by reacting a suitable salt with the acid to form the salt, and where appropriate adding carbon dioxide to the reaction mixture to form the carbonate of any cation beyond that needed to form the salt. A preferred friction modifier is zinc oleate.

5. Antiwear/Extreme Pressure Agents.

Dialkyl dithiophosphate succinates may be added to provide antiwear protection. Zinc salts are preferably added as zinc salts of phosphorodithioic acids or dithiocarbamic acid. Among the preferred compounds for use are zinc, diisooctyl dithiophosphate and zinc dibenzyl dithiophosphate and amyl dithiocarbamic acid. Also included in lubricating compositions in the same weight percent range as the zinc salts to give antiwear/extreme pressure performance are dibutyl hydrogen phosphite (DBPH) and triphenyl monothiophosphate, and the thiocarbamate ester formed by reacting dibutyl amine-carbon disulfide- and the methyl ester of acrylic acid. The thiocarbamate is described in U.S. Pat. No. 4,758,362 and the phosphorus-containing metal salts are described in U.S. Pat. No. 4,466,894. Both patents are incorporated herein by reference. Antimony or lead salts may also be used for extreme pressure. The preferred salts are of dithiocarbamic acid such as antimony diamyldithiocarbamate.

6. Viscosity Modifiers. Viscosity modifiers (VM) and dispersant viscosity modifiers (DVM) are well known. Examples of VMs and DVMs are polymethacrylates, polyacrylates, polyolefins, styrene-maleic ester copolymers, and similar polymeric substances including homopolymers, copolymers and graft copolymers. Examples of commercially available VMs, DVMs and their chemical types are listed below. The DVMs are designated by a (D) after their number. Representative viscosity modifiers that are commercially available are listed below in Table 1.

TABLE 1

| VISCOSITY MODIFIER | TRADENAME AND COMMERCIAL SOURCE | |
|---|---|---|
| 1. Polyisobutylenes | Indopol ® | Amoco |
| | Parapol ® | Exxon (Paramins) |
| | Polybutene ® | Chevron |
| | Hyvis ® | British Petroleum |
| 2. Olefin copolymers | Lubrizol ® 7060, 7065, 7067 | Lubrizol |
| | Paratone ® 8900, 8940, 8452, 8512 | Exxon |
| | ECA-6911 | Exxon (Paramins) |
| | TLA 347, 555(D), 6723(D) | Texaco |
| | Trilene ® CP-40, CP-60 | Uniroyal |
| 3. Hydrogenated-styrenediene copolymers | Shellvis ® 50, 40 | Shell |
| | LZ ® 7341, 7351, 7441 | Lubrizol |
| 4. Styrene, maleate copolymers | LZ ® 3702(D), 3715, 3703(D) | Lubrizol |
| 5. Polymethacrylates (PMA) | Acryloid ® 702, 954(D), 985(D), 1019, 1265(D) | Rohm GmbH |
| | TLA 388, 407, 5010(D), 5012(D) | Texaco |
| | Viscoplex ® 4-950(D), 6-500(D), 1515 | Rohm Gmbh |
| 6. Olefin-graft PMA polymer | Viscoplex ® 2-500, 2-600 | Rohm GmbH |
| 7. Hydrogenated polyisoprene star polymers | Shellvis ® 200, 260 | Shell |

Summaries of viscosity modifiers can be found in U.S. Pat. Nos. 5,157,088, 5,256,752 and 5,395,539, which are incorporated herein by reference. The VMs and/or DVMs preferably are incorporated into the fully-formulated compositions at a level of up to 10% by weight.

7. Pour Point Depressants (PPD). These components are particularly useful to improve low temperature qualities of a lubricating oil. A preferred pour point depressant is an alkylnaphthalene. Pour point depressants are disclosed in U.S. Pat. Nos. 4,880,553 and 4,753,745, which are incorporated herein by reference. PPDs are commonly applied to lubricating compositions to reduce viscosity measured at low temperatures and low rates of shear. The pour point depressants are preferably used in the range of 0.1–5 weight percent. Examples of tests used to access low temperature low shear-rate rheology of lubricating fluids include ASTM D97 (pour point), ASTM D2983 (Brookfield viscosity), D4684 (Mini-rotary Viscometer) and D5133 (Scanning Brookfield).

Examples of commercially available pour point depressants and their chemical types are listed in Table 2.

TABLE 2

| Pour Point Depressant | Tradename | Source |
|---|---|---|
| Polymethacrylates | Acryloid 154-70, 3004, 3007 | Rohm & Haas |
| | LZ ® 7749B, 7742, 7748 | Lubrizol |
| | TC 5301, 10314 | Texaco |
| | Viscoplex ® 1-31, 1-330, 5-557 | Rohm GmbH |
| Vinyl acetate/ fumarate or maleate copolymers | ECA 11039, 9153 | Exxon (Paramins) |
| Styrene, maleate copolymers | LZ ® 662 | Lubrizol |

8. Detergents. Lubricating compositions in many cases also preferably include detergents. Detergents as used herein are preferably metal salts of organic acids. The organic acid portion of the detergent is preferably a sulphonate, carboxylate, phenate, or salicylate. The metal portion of the detergent is preferably an alkali or alkaline earth metal. Preferred metals are sodium, calcium, potassium and magnesium. Preferably, the detergents are overbased, meaning that there is a stoichiometric excess of metal over that needed to form the neutral metal salt.

Preferred overbased organic salts are the sulfonate salts having a substantially oleophilic character and which are formed from organic materials. Organic sulfonates are well known materials in the lubricant and detergent arts. The sulfonate compound should preferably contain on average from about 10 to about 40 carbon atoms, more preferably from about 12 to about 36 carbon atoms and most preferably from about 14 to about 32 carton atoms on average. Similarly, the phenates, oxylates and carboxylates preferably have a substantially oleophilic character.

While the present invention allows for the carbon atoms to be either aromatic or in paraffinic configuration, it is highly preferred that alkylated aromatics be employed. While naphthalene based materials may be employed, the aromatic of choice is the benzene moiety.

The one particularly preferred component is thus an overbased monosulfonated alkylated benzene, and is preferably the monoalkylated benzene. Preferably, alkyl benzene fractions are obtained from still bottom sources and are mono- or di-alkylated. It is believed, in the present invention, that the mono-alkylated aromatics are superior to the dialkylated aromatics in overall properties.

It is preferred that a mixture of mono-alkylated aromatics (benzene) be utilized to obtain the mono-alkylated salt (benzene sulfonate) in the present invention. The mixtures wherein a substantial portion of the composition contains polymers of propylene as the source of the alkyl groups assist in the solubility of the salt. The use of monofunctional (e.g., mono-sulfonated) materials avoids crosslinking of the molecules with less precipitation of the salt from the lubricant. It is preferred that the salt be overbased. The excess metal from overbasing has the effect of neutralizing acids which may build up in the lubricant. A second advantage is that the overbased salt increases the dynamic coefficient of friction. Preferably, the excess metal will be present over that which is required to neutralize the acids at about in the ratio of up to about 30:1, preferably 5:1 to 18:1 on an equivalent basis.

The amount of the overbased salt utilized in the composition is preferably from about 0.1 to about 10 weight percents on an oil free basis. The overbased salt is usually made up in about 50% oil with a TBN range of 10–600 on an oil free basis. Borated and non-borated overbased detergents are described in U.S. Pat. Nos. 5,403,501 and 4,792,410 which are herein incorporated by reference for disclosure pertinent hereto.

9. Phosphorus acids. The lubricating compositions can also preferably include at least one phosphorus acid, phosphorus acid salt, phosphorus acid ester or derivative thereof including sulfur-containing analogs preferably in the amount of 0.002–1.0 weight percent. The phosphorus acids, salts, esters or derivatives thereof include compounds selected from phosphorus acid esters or salts thereof, phosphites, phosphorus-containing amides, phosphorus-containing carboxylic acids or esters, phosphorus containing ethers and mixtures thereof In one embodiment, the phosphorus acid, ester or derivative can be a phosphorus acid, phosphorus acid ester, phosphorus acid salt, or derivative thereof. The phosphorus acids include the phosphoric, phosphonic, phosphinic, and thiophosphoric acids including dithiophosphoric acid as well as the monothiophosphoric, thiophosphinic and thiophosphonic acids.

One class of compounds are adducts of O,O-dialkylphosphorodithioates and esters of maleic or fumaric acid. The compounds can be prepared by known methods as described in U.S. Pat. No. 3,359,203, as for example O,O-di(2-ethylhexyl) S-(1,2-dicarbobutoxyethyl) phosphorodithioate.

Another class of compounds useful to the invention are dithiophosphoric acid esters of carboxylic acid esters. Preferred are alkyl esters having 2 to 8 carbon atoms, as for example 3-[[bis(1-methylethoxy)phosphinothioyl]thio] propionic acid ethyl ester.

A third class of ashless dithiophosphates for use with the present invention include:

(i) those of the formula

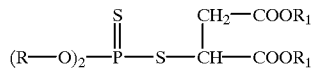

wherein R and $R_1$ are independently selected from alkyl groups having 3 to 8 carbon atoms (commercially available as VANLUBE 7611M, from R. T. Vanderbilt Co., Inc.);

(ii) dithiophosphoric acid esters of carboxylic acid such as those commercially available as IRGALUBE® 63 from Ciba Geigy Corp.;

(iii) triphenylphosphorothionates such as those commercially available as IRGALUBE® TPPT from Ciba Geigy Corp.; and (iv) methylene bis(dialkyldithiocarbamates) wherein the alkyl group contains 4 to 8 carbon atoms. For example, methylenebis(dibutyldithiocarbamate) is commercially available as VANLUBE 7723® from R. T. Vanderbilt Co., Inc).

Zinc salts are preferably added to lubricating compositions in amounts of 0.1–5 triphenylphosphorothionates wherein the phenyl group may be substituted by up to two alkyl groups. An example of this group, among others, is triphenyl-phosphorothionate available commercially as IRGALUBE® TPPT (manufactured by Ciba-Geigy Corp.).

A preferred group of phosphorus compounds are dialkyphosphoric acid mono alkyl primary amine salts, such as those described in U.S. Pat. No. 5,354,484 which is herein incorporated by reference. Eighty-five percent phosphoric acid is the preferred compound for addition to the fully formulated ATF package and is preferably included at a level of about 0.01–0.3 weight percent based on the weight of the ATF.

The synergistic amine salts of alkyl phosphates are prepared by known methods, e.g., a method disclosed in U.S. Pat. No. 4,130,494, incorporated herein by reference. A suitable mono- or diester of phosphoric acid or their mixtures is neutralized with an amine. When mono-ester is used, two moles of the amine will be required, while the diester will require one mole of the amine. In any case, the amount of amine required can be controlled by monitoring the neutral point of the reaction where the total acid number is essentially equal to the total base number. Alternately, a neutralizing agent such as ammonia or ethylenediamine can be added to the reaction.

The preferred phosphate esters are aliphatic esters, among others, 2-ethylhexyl, n-octyl, and hexyl mono-or diesters. The amines can be selected from primary or secondary amines. Particularly preferred are tert-alkyl amines having 10 to 24 carbon atoms. These amines are commercially available as for example Primene® 81R manufactured by Rohm and Haas Co.

The synergistic sulfonic acid salts are well known in the art and are available commercially. Representative of the aromatic sulfonic acids that can be used in preparing the synergists of the invention are alkylated benzenesulfonic acids and alkylated naphthalenesulfonic acids having 1 to 4 alkyl groups of 8 to 20 carbons each. Particularly preferred are naphthalenesulfonates substituted by alkyl groups having 9 to 18 carbons each, as for example dinonylnaphthalenesulfonate.

10. Antifoamants. Antifoaming agents are well-known in the art as silicone or fluorosilicone compositions. Such antifoam agents are available from Dow Coming Chemical Corporation and Union Carbide Corporation. A preferred fluorosilicone antifoam product is Dow FS-1265. Preferred silicone antifoam products are Dow Coming DC-200 and Union Carbide UC-L45. Other antifoam agents which may be included in the composition either alone or in admixture is a polyacrylate antifoamer available from Monsanto Polymer Products Co. of Nitro, West Virginia known as PC-1244. Also, a siloxane polyether copolymer antifoamer available from OSI Specialties, Inc. of Farmington Hills, Michigan and may also be included. One such material is sold as SILWET-L-7220. The antifoam products are preferably included in the compositions of this invention at a level of 5 to 80 parts per million with the active ingredient being on an oil-free basis.

EXAMPLES

The following examples are provided to illustrate the use of the lubricating compositions containing aromatized TMDQ polymers in accordance with the present invention.

All percentages and parts are based on weight unless otherwise indicated.

Example 1

For evaluation of thermal stability, several lubricating compositions were prepared and evaluated. Sample A contained formulated diester base oil (XR No. 2437-RT manufactured by Quaker USA) and served as control. Sample B contained the formulated diester base oil and two weight percent of AGERITE® MA (aromatized 1,2-dihydro-2,2,4-trimethylquinoline polymer with predominantly 2 to 6 monomer units). Sample C contained the formulated diester base oil and two weight percent of VANLUBE® RD (a non-aromatized 1,2-dihydro-2,2,4-trimethylquinoline composed of dimer and trimer units) and served as a comparative sample.

Thermal stability was evaluated by a modified ASTM D2070-91 test for determining the thermal stability of oil based compositions. The test is known as the Cincinnati Milacron method. Copper and steel rods in contact with the oil were evaluated for appearance and weight loss after 168 hours at 135° C. Sludge was determined by filtering oil through No. 41 Whatman pad and 8 micron pad and weighing the residue. The total weight was calculated by adding the weight of the filtrates to that of sludge removed from copper rods. The sludge test was conducted by the ASTM D-4310 test conducted for 1000 hours at 95° C. Changes in viscosity change were determined by ASTM D-445 test at 40° C. The oxidation stability of the samples was determined by a modified ASTM D-943 method in terms of the Neutralization Number increase. The test was conducted until the test oil reached a total acid number of 2 mg KOH/g of oil at 95° C. The rust inhibition test was conducted by the ASTM D-665 method using the "A" procedure. This test was conducted for 24 hours at 60° C. The results of these various tests are listed in Table 3.

TABLE 3

| Component | Sample A | Sample B | Sample C |
|---|---|---|---|
| Base oil (%) | 100.00 | 98.00 | 98.00 |
| Aromatized polymer (%) | — | 2.0 | — |
| Non-aromatized polymer (%) | — | — | 2.0 |
| Functional Properties ASTM D-2070-91 | | | |
| Viscosity charge (%) | 1.97 | −0.64 | −2.57 |
| Copper rating | 4 | 5 | 3 |
| Copper loss, mg | 1.0 | 2.4 | 0.7 |
| Steel rating | 1 | 1 | 1 |
| Iron loss, mg | −0.1 | 0 | 0.2 |
| Total Sludge, mg | 3.2 | 4.15 | 5.9 |
| ASTM-943 Neutralization number | | | |
| 0 hours | 1.93 | 2.4 | 2.34 |
| 336 hours | 2.76 | 4.36 | 10.78 |
| 672 hours | 3.18 | 9.64 | 14.16 |
| ASTM D-665 | | | |
| Rust Test A | Pass | Pass | Pass |

As can be seen from Table 3, sample B which contained the aromatized polymer exhibited a significant improvement in stability and corrosion characteristics as compared to sample C which contained the non-aromatized polymer. For example, sample B surprisingly exhibited a change in viscosity of only −0.64%, while sample C exhibited a change in viscosity of −2.57%. Sample B also exhibited reduced neutralization numbers at 336 and 672 hours as compared to sample C. At 336 hours, sample B exhibited a neutralization number of 4.36, while sample C exhibited a neutralization number of 10.78 (a 247% difference). At 672 hours, sample B exhibited a neutralization number of 9.64, while sample C exhibited a neutralization number of 14.16 (a 146% difference). Accordingly, lubricating compositions containing aromatized TMDQ polymers provide superior performance in comparion to lubricating compositions containing the non-aromatized TMDQ polymers.

Example 2

The high temperature stability of base oils containing the aromatized and non-aromatized TMDQ polymers was evaluated. Lubricating compositions were prepared using the TMDQ polymers described in Example 1 in varying concentrations. The thermal stability of compositions was evaluated using the standard ICI thermal stability test, which entailed heating samples of the lubricating compositions at 200° C. in 150 mL beakers with a steel coupon for 24 hours. The composition of the samples and the results of the thermal stability tests are listed in Table 4.

TABLE 4

| | Mass Percent | | | |
|---|---|---|---|---|
| Aromatized TMDQ polymer | 1.0 | 2.0 | | |
| Non-aromatized TMDQ polymer | | | 1.0 | 2.0 |
| DGLP 150 (diester synthetic oil) | 99.0 | 98.0 | 99.0 | 98.0 |
| Weight loss in Forced Air Oven | 59.2 | 12.5 | 63.5 | 28.1 |
| Appearance: | | | | |
| Steel Coupon | no change | slight brown tarnish | no change | no change |
| Liquid | red-orange | red-orange | red-orange | red-orange |

From Table 4, it is readily evident that the lubricating compositions containing the aromatized TMDQ polymers outperformed lubricating compositions containing the non-aromatized TMDQ polymers. For example, at 1.0 wt. % additive, the composition containing the aromatized polymer exhibited a weight loss of 59.2 while the composition containing the non-aromatized polymer exhibited a weight loss of 63.5. At 2.0 wt. % additive, a more dramatic difference was observed with weight losses of 12.5 for the aromatized polymer versus 28.1 for the non-aromatized polymer. Thus, the aromatized TMDQ polymers provided a significant improvement in thermal stability.

What is claimed is:

1. A lubricating composition comprising a major amount of a base oil and an effective amount of an additive component comprising one or more compounds of formula (I):

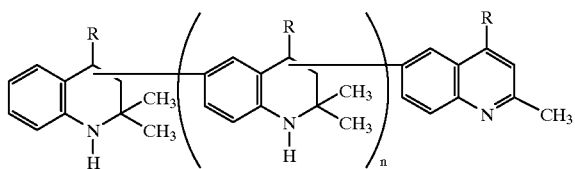

(I)

wherein R represents a radical selected from the group consisting of methyl, ethyl, n-propyl, i-propyl and mixtures thereof, and n has a value of 0–8.

2. The composition according to claim 1, wherein R is a methyl radical and n=0–6.

3. The composition according to claim 2, wherein n=0–4.

4. The composition according to claim 1, wherein the additive component is present in a concentration of about 0.01–10 weight percent, based on the total weight of the lubricating composition.

5. The composition according to claim 4, wherein the concentration of the additive component is about 0.1–5 weight percent.

6. The composition according to claim 5, wherein the concentration of the additive component is about 1–3 weight percent.

7. The composition according to claim 1, wherein the base oil is a base oil of lubricating viscosity.

8. A lubricating composition comprising a major amount of a base oil and an effective amount of an additive component comprising one or more compounds of formula (II):

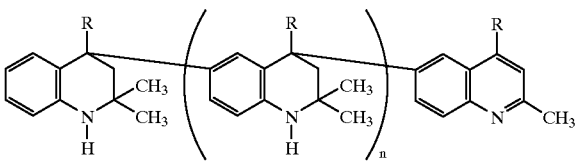

(II)

wherein R represents a radical selected from the group consisting of methyl, ethyl, n-propyl or i-propyl, and mixtures thereof, and n=0–8.

9. The composition according to claim 8, wherein R is a methyl group and n=0–6.

10. The composition according to claim 9, wherein n=0–4.

11. The composition according to claim 8, wherein the additive component is present in a concentration of about 0.01–10 weight percent, based on the total weight of the lubricating composition.

12. The composition according to claim 11, wherein the concentration of the additive component is about 0.1–5 weight percent.

13. The composition according to claim 12, wherein the concentration of the additive component is about 1–3 weight percent.

14. The composition according to claim 8, wherein the base oil is a base oil of lubricating viscosity.

15. A lubricating composition comprising a major amount of a base oil and an effective amount of an additive component comprising one or more compounds of formula (III):

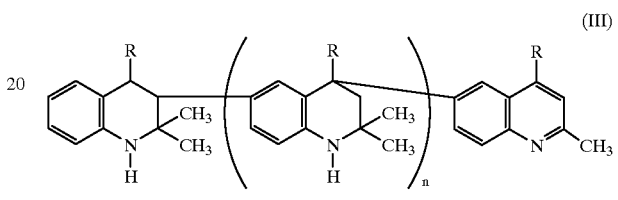

(III)

wherein R is a radical selected from the group consisting of methyl, ethyl, n-propyl, i-propyl and mixtures thereof, and n=0–8.

16. The composition according to claim 15, wherein R is a methyl radical and n=0–6.

17. The composition according to claim 16, wherein n=0–4.

18. The composition according to claim 5, wherein the additive component is present in a concentration of about 0.01–10 weight percent, based on the total weight of the lubricating composition.

19. The composition according to claim 18, wherein the concentration of the additive component is about 0.1–5 weight percent.

20. The composition according to claim 19, wherein the concentration of the additive component is about 1–3 weight percent.

21. The composition according to claim 15, wherein the base oil is a base oil of lubricating viscosity.

* * * * *